(12) United States Patent
Wang

(10) Patent No.: US 11,283,779 B2
(45) Date of Patent: Mar. 22, 2022

(54) SYSTEM AND METHOD FOR SECURING SENSITIVE INFORMATION

(71) Applicant: ServiceNow, Inc., Santa Clara, CA (US)

(72) Inventor: Chang Wang, Bellevue, WA (US)

(73) Assignee: ServiceNow, Inc., Santa Clara, CA (US)

(*) Notice: Subject to any disclaimer, the term of this patent is extended or adjusted under 35 U.S.C. 154(b) by 155 days.

(21) Appl. No.: 15/485,061

(22) Filed: Apr. 11, 2017

(65) Prior Publication Data

US 2018/0295109 A1    Oct. 11, 2018

(51) Int. Cl.
*H04L 29/06* (2006.01)
*G06F 21/62* (2013.01)
*H04L 9/08* (2006.01)

(52) U.S. Cl.
CPC ...... *H04L 63/0442* (2013.01); *G06F 21/6227* (2013.01); *G06F 21/6245* (2013.01); *H04L 9/0894* (2013.01); *H04L 63/0471* (2013.01); *H04L 63/166* (2013.01)

(58) Field of Classification Search
None
See application file for complete search history.

(56) References Cited

U.S. PATENT DOCUMENTS

| | | |
|---|---|---|
| 7,020,706 B2 | 3/2006 | Cates |
| 7,716,353 B2 | 5/2010 | Golovinsky |
| 7,720,884 B1* | 5/2010 | Gandhi ............ G06F 17/30292 707/804 |
| 7,769,718 B2 | 8/2010 | Murley |
| 7,925,981 B2 | 4/2011 | Pourheidari |
| 8,402,127 B2 | 3/2013 | Solin |
| 8,612,408 B2 | 12/2013 | Trinon |
| 8,832,652 B2 | 9/2014 | Mueller |

(Continued)

OTHER PUBLICATIONS

Himanshu Gupta and Vinod Kumar Sharma, Multiphase Encryption: A New Concept in Modern Cryptography, Aug. 2013 International Journal of Computer Theory and Engineering, vol. 5, No. 4, at 638 (Year: 2013).*

(Continued)

*Primary Examiner* — Kari L Schmidt
*Assistant Examiner* — Edward X Long
(74) *Attorney, Agent, or Firm* — Fletcher Yoder PC

(57) ABSTRACT

A system and method for transmitting encrypted record values stored in a database from a provider environment to a customer environment are provided. The system comprises a memory with instructions executable by a processor to encrypt a received value using a first encryption mechanism associated with the provider environment to provide an encrypted record value, and responsive to a request for the encrypted record value, store the encrypted record value in a database, decrypt the encrypted record value using the first encryption mechanism to provide a decrypted record value, encrypt the decrypted record value using a second public key of a second encryption mechanism associated with the customer environment to provide a re-encrypted record value, store the re-encrypted record value in a staging database, and transmit the re-encrypted record value from the staging database to an agent software in the customer environment.

17 Claims, 11 Drawing Sheets

(56) References Cited

U.S. PATENT DOCUMENTS

| | | |
|---|---|---|
| 9,098,322 B2 | 8/2015 | Apte |
| 9,317,327 B2 | 4/2016 | Apte |
| 9,363,252 B2 | 6/2016 | Mueller |
| 9,369,443 B1* | 6/2016 | Sinor .................. H04L 63/08 |
| 9,645,833 B2 | 5/2017 | Mueller |
| 9,654,473 B2 | 5/2017 | Miller |
| 9,766,935 B2 | 9/2017 | Kelkar |
| 9,805,322 B2 | 10/2017 | Kelkar |
| 2004/0193900 A1* | 9/2004 | Nair .................. G07F 17/305 |
| | | 713/193 |
| 2012/0185264 A1* | 7/2012 | Demogenes ........... G06Q 50/22 |
| | | 705/2 |
| 2015/0156174 A1* | 6/2015 | Fahey .................. H04L 63/18 |
| | | 713/168 |
| 2015/0254474 A1* | 9/2015 | Nelke ................ G06F 21/6254 |
| | | 726/26 |
| 2016/0210064 A1* | 7/2016 | Dornemann ........ G06F 11/1469 |
| 2017/0012945 A1* | 1/2017 | Poffenbarger ...... H04L 63/0428 |
| 2018/0034786 A1* | 2/2018 | Srinivasan ................ H04L 9/14 |

OTHER PUBLICATIONS

Vipin et al., Efficient On-line SPAM Filtering for Encrypted Messages, 2015, pp. 1-5. (Year: 2015).*

Launchbury et al., Efficient Lookup-Table Protocol in Secure Multiparty Computation, 2012, IFCP'12, pp. 189-200. (Year: 2012).*

* cited by examiner

FIG. 6A

| GENERAL | INPUTS | EXECUTION COMMAND | OPTIONS | CONDITIONS |
|---|---|---|---|---|

| NAME | TYPE | MANDATORY | DEFAULT |
|---|---|---|---|
| { } INPUT | | | |
| ABC USERNAME | STRING | NO | |
| 🔒 PASSWORD | ENCRYPTED | NO | |

| GENERAL | INPUTS | EXECUTION COMMAND | OPTIONS | CONDITIONS |
|---|---|---|---|---|

| *JDBC CONNECTION | Localhost |
|---|---|
| *CREDENTIAL | Localhost |
| *SQL STATEMENT | CREATE USER '${activityinput.username}'@'localhost' IDENTIFIED BY '${activityinput.password}'; |

| { } INPUT |
| ABC USERNAME |
| 🔒 PASSWORD |

VARIABLES [DIAGRAMMER VIEW]

\*COLUMN NAME: u_user_pass — 648

APPLICATION: GLOBAL

MANDATORY ☐

AUDIT ☐

\*LABEL: USER PASSWORD

TYPE: PASSWORD (2 WAY ENCRYPT) — 646

UPDATE  DELETE COLUMN

NAME: CREATE MySQL USER

STAGE: — 645

USERNAME: testuser — 644

PASSWORD: ${workflow.inputs.u_user_pass} — 642

SUBMIT

640

```
{
  "User":"test_user",
  "password_expired":"N",
  "Host":"localhost",
  "Password":"p9RC1sq9+lk3vNFtBqFtY3YRjuSyzTiNH8JdZMjhpo7wmoLocjlsi1Rlz9UYOxyU"
}
```

*FIG. 10*

SYSTEM AND METHOD FOR SECURING SENSITIVE INFORMATION

BACKGROUND

To secure and communicate data, devices in a computing infrastructure may exchange the data over an encrypted transport protocol, such as secure sockets layer (SSL) or transport layer security (TLS). Additionally, data can also be encrypted at rest by the software or device that hosts (e.g. maintains) the data.

SUMMARY

Disclosed herein are implementations of securing sensitive information within a computing infrastructure.

In an implementation, a system is provided for transmitting encrypted record values stored in a database from a provider environment to a customer environment. The system includes a server device operating in the provider environment. The server device includes a memory and a processor. The memory includes instructions executable by the processor to encrypt a received value using a first encryption mechanism associated with the provider environment to provide an encrypted record value, and store the encrypted record value in the database. The memory also includes instructions executable by the processor to, responsive to a request for the encrypted record value, decrypt the encrypted record value using the first encryption mechanism to provide a decrypted record value, and encrypt the decrypted record value using a second public key of a second encryption mechanism to provide a re-encrypted record value. A second private key of the second encryption mechanism is stored in the customer environment and is inaccessible by the server device. The memory further includes instructions executable by the processor to store the re-encrypted record value in a staging database, and transmit the re-encrypted record value from the staging database to an agent software in the customer environment.

In an implementation, a method is provided for transmitting encrypted record values stored in a database from a provider environment to a customer environment. The method includes encrypting a received value using a first encryption mechanism associated with the provider environment to provide an encrypted record value, storing the encrypted record value in the database, decrypting the encrypted record value using the first encryption mechanism to provide a decrypted record value, and encrypting the decrypted record value using a second public key of a second encryption mechanism associated with the customer environment, to provide a re-encrypted record value. A second private key of the second encryption mechanism is inaccessible by the provider environment. The method further includes storing the re-encrypted record value in a staging database, and in response to a request received by the provider environment, transmitting the re-encrypted record value from the staging database to an agent software in the customer environment.

In an implementation, a non-transitory computer-readable storage medium is provided for transmitting an encrypted record value stored in a database to an agent software. The non-transitory computer-readable storage medium includes executable instructions that, when executed by a processor, facilitate performance of operations. The operations include receiving a request to transmit to the agent software the encrypted record value that is encrypted using a first encryption mechanism, decrypting the encrypted record value using the first encryption mechanism to provide a decrypted record value, encrypting the decrypted record value to provide a re-encrypted record value using a second encryption mechanism, and transmitting the re-encrypted record value to the agent software.

These and other aspects of this disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

FIGS. 6A-6C are an illustration of an example of graphical user interfaces for configuring an activity usable for securing sensitive information within a computing infrastructure in accordance with the present disclosure.

FIG. 10 is an illustration of output returned by an agent software in accordance with the present disclosure.

DETAILED DESCRIPTION

Figure 1:
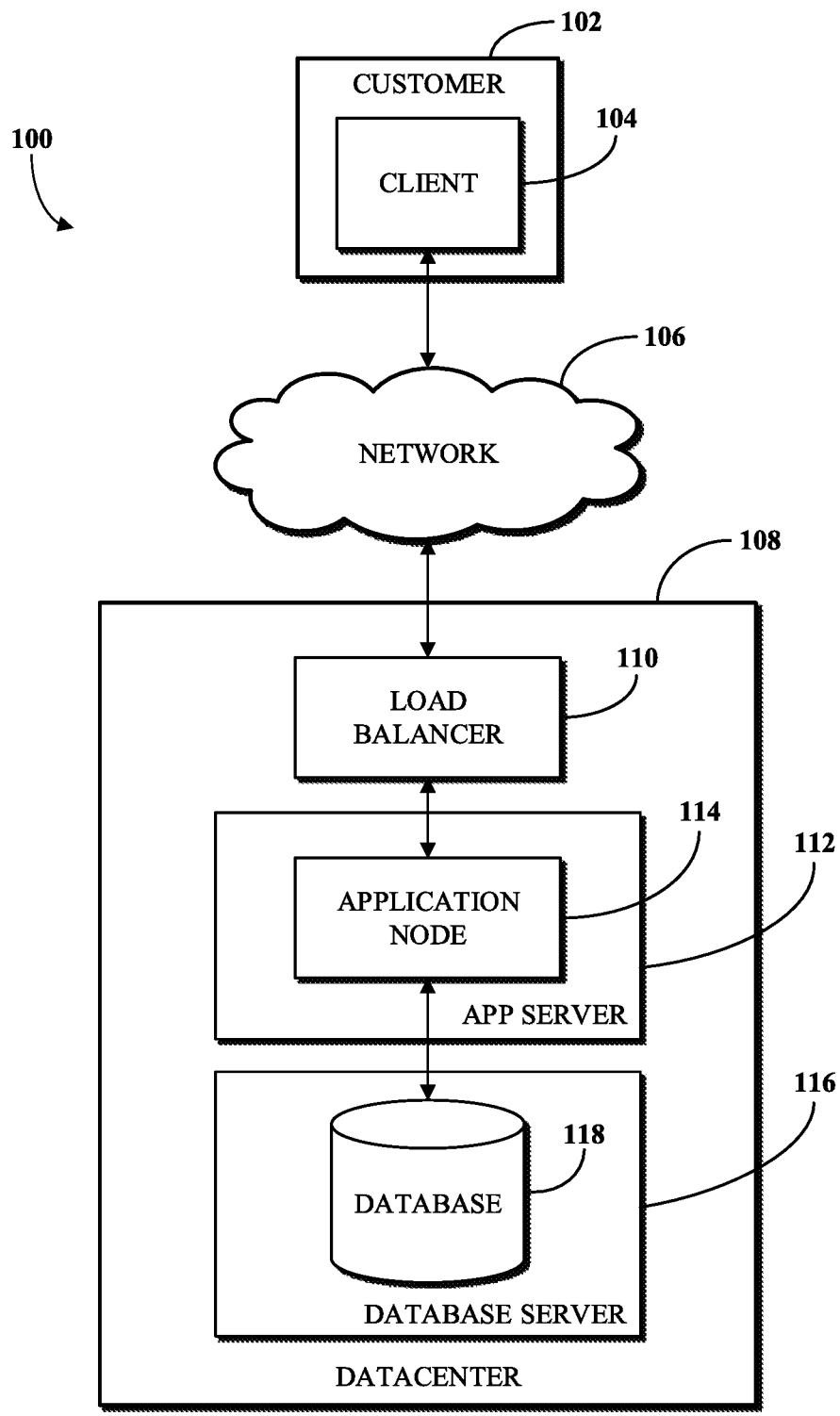
FIG. 1 is a block diagram of an example of an electronic computing and communications system in accordance with the present disclosure.

A software application can be the system of record for, or can have copies of, sensitive information. Sensitive information can, for example, be information that should not be disclosed to certain third parties. Disclosure of sensitive information can be restricted by encrypting the sensitive information. For example, the encryption of sensitive information when it is stored, or "at rest," can operate to prevent unauthorized third parties from accessing the sensitive information even if they gain access to the mechanism (e.g., database records) that holds or stores the sensitive information.

The software application can, for example, encrypt, or have encrypted, the sensitive information in a data store that holds or stores the sensitive information. For example, a software application can have sensitive information stored in a database as encrypted information. Encrypting the sensitive information in the data store prevents access to the information by, for example, a person who may have, or gains, unauthorized access to the data store. Encrypting the sensitive information in a data store may be known as encryption at rest. Additionally, the software application may need to communicate the sensitive information to another system. For example, to enable a business process or to fulfil a user request, the software application may retrieve the encrypted information from the data store, decrypt it (or receive it as decrypted data from the data store), process the information, and communicate the information to the other system. In such an example, the data may be decrypted before transmission because the receiving device or software does not have the ability to decrypt the data. The communication between the software application and the other application can occur, for example, over an encrypted transport protocol such as SSL or TLS. Encrypting information as it is communicated over a computer network may be known as encryption in transit.

Encrypting sensitive information in a data store and encrypting it in transit, in some situations, may not be sufficient to prevent disclosure, in clear text, of the sensitive information. Clear text can mean, for example, information that is in a form immediately understandable (e.g. readable) by a human being. For example, the data to be transmitted may have to be queued in a table in the form in which it is to be transmitted. As another example, in response to processing the sensitive information and communicating it to the other system, the software application may need to create a history record or an audit trail of the communication to the other system. As such, the history record may include the processed information, that is, a clear text version of the sensitive information. Such an outcome may be undesirable as it may result in disclosure of the sensitive information.

A method, system, and computer-readable medium in accordance with the present disclosure can include re-encrypting the information prior to communicating it to the other system and recording the re-encrypted communication in the history record. The re-encryption can be performed using an encryption that the receiver of the transmission can decrypt. In the case where transport communication is configured, the improved approach can provide a second level of encryption. Additionally, encrypting the data in the history record may prevent the disclosure, in clear text, of the sensitive information.

Implementations of this disclosure provide technological improvements particular to computer networks, for example, those concerning the communication of sensitive information in an electronic computing and communications system. Computer network-specific technological problems, such as disclosure, in clear text, of sensitive information, can be wholly or partially solved by implementations of this disclosure. For example, this disclosure provides for the decryption and re-encryption of the information prior to communicating it to another system and prior to logging a record (e.g., a history record) of the communication. The implementations of this disclosure introduce new and efficient improvements in the ways in which sensitive information is communicated between systems by re-encrypting the information prior to communicating it and logging a record of the encrypted communication.

To describe some implementations in greater detail, reference is first made to examples of hardware structures. FIG. 1 is a block diagram of an example of an electronic computing and communications system 100 in accordance with the present disclosure. As used herein, the term "electronic computing and communications system," or variations thereof, can be, or include, a distributed computing system (e.g., a client-server computing system), a cloud computing system, a clustered computing system, or the like.

The system 100 can include one or more customers 102. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

In some implementations, the client 104 can be an instance of an application running on a customer device associated with the customer 102. As used herein, the term "software" can include, but is not limited to, applications, programs, instances, processes, threads, services, plugins, patches, application version upgrades, or any other identifiable computing unit capable of accessing or interacting with, directly or indirectly, a database. The system 100 can include any number of customers or clients or can have a configuration of customers or clients different from that generally illustrated in FIG. 1. For example, and without limitation, the system 100 can include hundreds or thousands of customers and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

In some implementations, the client 104 and the servers associated with the datacenter 108 are configured to connect to, or communicate via, a network 106. In some implementations, a client 104 associated with the customer 102 can connect to the network 106 via a communal connection point, link, or path. In some implementations, a client 104 associated with the customer 102 can connect to, or communicate via, the network 106 using a distinct connection point, link, or path. A connection point, link, or path can be wired, wireless, use other communications technologies, or a combination thereof.

In some implementations, the network 106 can include, for example, the Internet. In some implementations, the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communication traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or application provided by the datacenter 108.

In some implementations, maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

In some implementations, the datacenter 108 includes an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. In some implementations, any number of application servers or database servers can be implemented at the datacenter 108. In some implementations, the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as the database 118 of the database server 116.

In some implementations, the application server 112 can include any suitable number of application nodes, depending upon a system load or other characteristics associated with the application server 112. For example, and without limitation, the application server 112 can include two or more nodes forming a node cluster. In some implementations, the application nodes implemented on a single application server 112 can run on different hardware servers.

The database server 116 stores, manages, or otherwise provides data for delivering services to the client 104 over a network. In some implementations, the database server 116 includes a data storage unit, such as a database 118, which can be accessible by an application executed on the application node 114. In some implementations, the database 118 can be implemented as a relational database management system (RDBMS), an object database, an XML database, a configuration management database (CMDB), a management information base (MIB), one or more flat files, other suitable non-transient storage mechanisms, or a combination thereof. By way of non-limiting example, the system 100, in some implementations, can include an XML database and a CMDB. While limited examples are described, the database 118 can be configured as or comprise any suitable database type. Further, the system 100 can include one, two, three, or any suitable number of databases configured as or comprising any suitable database type or combination thereof.

In some implementations, the database 118 can be configured as or comprise a CMDB. A CMDB can be comprised of a plurality of configuration items (CIs), attributes associated with the CIs, or relationships between CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database 118, or any other element, portion of an element, or combination of elements of the electronic computing and communications system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

In some implementations, one or more databases (e.g., the database 118), tables, other suitable information sources, or portions or combinations thereof can be stored, managed, or otherwise provided by one or more of the elements of the system 100 other than the database server 116, such as the client 104 or the application server 112.

Some or all of the systems and techniques described herein can operate or be executed on or by the servers associated with the system 100. For example, an update for an application executed on the application node 114 can include updating or upgrading the database 118. In some implementations, the systems and techniques described herein, portions thereof, or combinations thereof can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

In some implementations, the network 106, one or more datacenters, such as the datacenter 108, and one or more load balancers, such as the load balancer 110, can be implemented within a distributed computing system. In some implementations, a load balancer associated with a distributed computing system (e.g., the load balancer 110) can communicate with the network 106, one or more datacenters (e.g., the datacenter 108), other load balancers, or a combination thereof. In some implementations, the load balancer 110 can be configured to route communications to a primary datacenter, identify a failover condition (e.g., such as an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the database 118, and the secondary datacenter can include a secondary database. In some implementations, the secondary database can include an exact or substantially exact mirror, copy, or replication of the primary database. In some implementations, the primary database or the secondary database can be implemented as a relational database management system (RDBMS), an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a service or application to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

In some implementations, a distributed computing system can allocate resources of a computer network using a multi-tenant or single-tenant architecture. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. In some implementations, customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

In some implementations, a customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
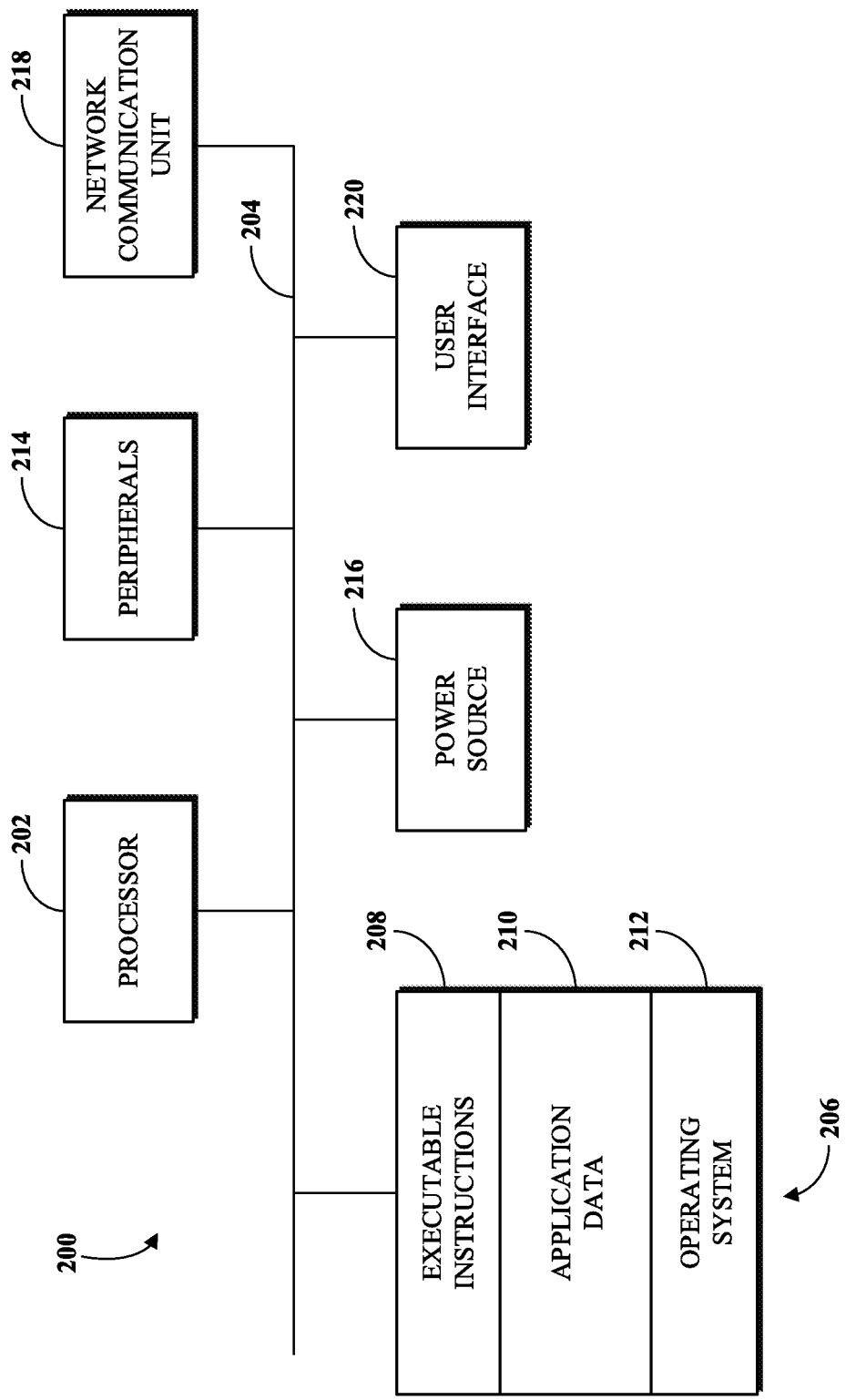
FIG. 2 is a block diagram of an example internal configuration of a computing device of an electronic computing and communications system in accordance with the present disclosure.

FIG. 2 is a block diagram of an example of an internal configuration of a computing device 200 of an electronic computing and communications system in accordance with the present disclosure. The computing device 200 can be a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

In some implementations, the memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. In some implementations, the memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a computing device 200 can include volatile memory, such as RAM, and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to secure and securely communicate sensitive information. The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, or an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204.

The network communication unit 218 can also be coupled to the processor 202 via the bus 204. In some implementations, network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display, (e.g., an OLED display), or other suitable display.

In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

Figure 3:
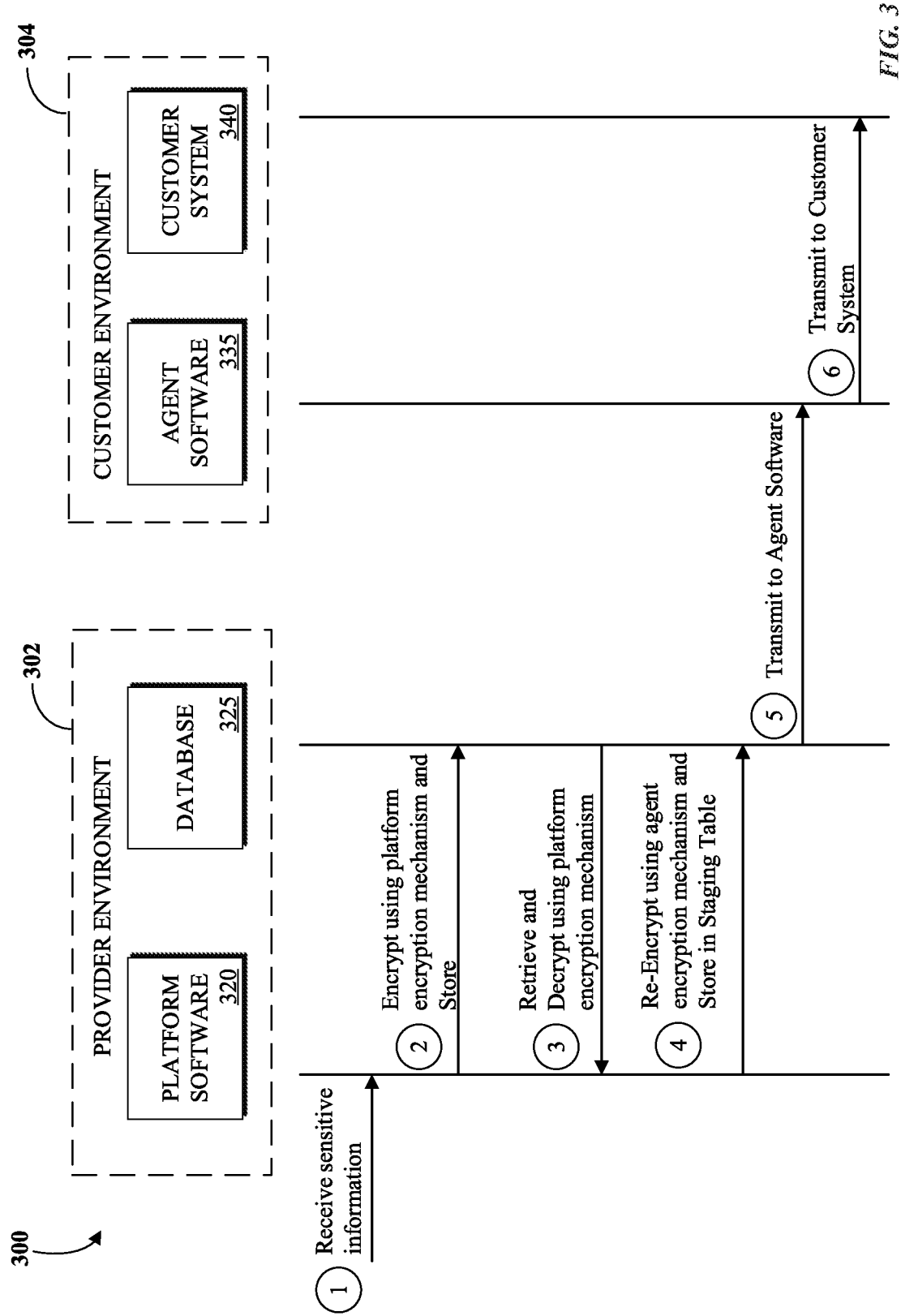
FIG. 3 is an interaction diagram for securing sensitive information within a computing infrastructure in accordance with the present disclosure.

FIG. 3 is an interaction diagram 300 for securing sensitive information within a computing infrastructure (such as the system 100 of FIG. 1) in accordance with the present disclosure. Referring to FIGS. 1 and 3 together, the interaction diagram 300 depicts components of a provider environment 302, components of a customer environment 304, and interactions thereof. The provider environment 302 can be implemented by or in one or more of the datacenter 108 of FIG. 1. The customer environment 304 can be implemented by or in one or more of the customer 102 of FIG. 1. The provider environment 302 includes a platform software 320 and a database 325. The platform software 320 can be, or can be a module of, the application node 114 of FIG. 1. The database 325 can be the database 118 of FIG. 1. The customer environment 304 includes an agent software 335 and a customer system 340. The provider environment 302 communicates information, including sensitive information, to the agent software 335. The provider environment 302 can communicate information to the customer system 340 through the agent software 335.

In some implementations, a provider environment can include networks and/or devices controlled (wholly or partially) by a provider, for example, a service provider of a Platform as a Service (PaaS) service. Thus, the provider environment can refer to networks and devices implemented within a datacenter under the control of a provider. In some implementations, the provider environment can also or instead refer to networks and devices outside of a datacenter, within multiple datacenters, or any other networks, devices, and/or software under the control of a provider. For example, if a service provider has twelve datacenters and also provides services from a virtual machine provided by another service provider, the provider environment may extend to the twelve data centers and the virtual machine that it controls.

In some implementations, a customer environment can include networks and/or devices controlled (wholly or partially) by a customer, for example, a customer of a PaaS service provider. For example, the customer environment can include networks, devices, and/or software under the control of a customer operating an Infrastructure as a Service (IaaS) service, for example, cloud computing instances implemented using resources of a provider, but controlled by the customer. In some implementations, a provider environment can have limited access to a customer environment. In some implementations, a customer environment can have limited access to a provider environment.

Information within an electronic computing and communications system, such as the system 100 of FIG. 1, can include sensitive information that is to be communicated and stored in encrypted form. Disclosure, in clear text, of such information is to be controlled. That is, sensitive information is to be stored as encrypted text rather than as clear text in the provider environment and information to be communicated to the customer environment 304 via a staging database, as explained herein, is also encrypted. Information can be deemed sensitive by the customer of the customer environment 304, by the provider of the provider environment 302, by a user (e.g. a human user) of the client device 104 of FIG. 1, by other entities, or any combination thereof. Sensitive information can also include information that is considered sensitive under laws such as federal, state, or national laws. Examples of sensitive information include employee salary information, credit card information, social security numbers, bank routing numbers for employee paychecks, password information, an Internet Protocol (IP) address, and the like.

As a non-limiting example, and for purposes of illustration only, the steps of the interaction diagram 300 are explained using a request to create a new user ("create user request").

At step 1 of FIG. 3, the platform software 320 receives a value that is sensitive information. The value can be received, for example, from the customer environment 304, from a user of the client 104 of FIG. 1, by bulk loading data into the platform software 320, or received in any way that makes available the value of sensitive information to the platform software 320. For example, the value can be received as part of a request initiated by a user of client 104 of FIG. 1 via a web browser. For example, in response to the user input (e.g., the user clicking on a "Create new user" link) data may be communicated to the platform software 320 indicating that the create user request has been initiated. The data includes a user name (e.g., an identifier of the new user to be created) and a password to associate with the user name. The password (i.e., the received value) is sensitive information. The request can cause an orchestration workflow to be initiated at or by the platform software 320 as further explained below. The step 1 can be further understood with reference to the platform encrypter module 402 of FIG. 4.

The received value can be communicated from the client 104 to a device within the provider environment 302 using transport encryption. For example, the communication of the password from the client 104 of FIG. 1 to a device within the provider environment 302 can be done using SSL or TLS. A router device, including but not limited to a load balancer such as the load balancer 110 of FIG. 1, within or otherwise associated with the provider environment 302 can terminate the transport encryption and relay the password received from the client 104 of FIG. 1 to a device implementing the platform software 320. The router device relays a clear text value of the password to the platform software 320. In some implementation, the client 104 of FIG. 1 may be configured to encrypt the password using an encryption mechanism independent of transport encryption. As such, the clear text value relayed by the router device may be an encrypted value.

At step 2 of FIG. 3, and upon determining that the received value is sensitive information, the platform software 320 encrypts the received value of sensitive information to produce an encrypted record value before communicating the sensitive information within the provider environment 302 including, but not limited to, storing the received value as an encrypted record value in the database 325. The platform software 320 encrypts the received value using a platform encryption mechanism. The platform encryption mechanism can be a one-way or a two-way encryption mechanism. The two-way encryption mechanism can be an asymmetric encryption scheme or a symmetric encryption scheme. The asymmetric encryption mechanism can use a public key for encryption and a private key for decryption or vice versa. Other platform encryption mechanisms can be utilized by the platform software 320 to encrypt the received value. The step 2 can be further understood with reference to the platform encrypter module 402 of FIG. 4.

Returning to the create user request example, in response to the create user request being indicated to or otherwise received by the platform software 320, the platform software 320, in response to determining that the password is sensitive information, encrypts the password (i.e., received value) using a platform encryption mechanism and stores the encrypted password (i.e., encrypted record value) in the database 325. The platform software 320 can determine that the password is sensitive information based on, including but not limited to, a data structure associated with the create user request wherein a password field is indicated as being sensitive information. Other ways are available for determining that information is sensitive. Processing the request is then initiated. Processing can be initiated immediately upon receipt at the platform software 320. Processing the request can mean a timed or delayed initiation of an orchestration workflow associated with the create user request. Processing the request can mean queuing the request for processing based on, including but not limited to, order of arrival of the request at the platform software 320.

At step 3 of FIG. 3, when the platform software 320 requires the sensitive information in order to execute its instructions (e.g., the instructions of an orchestration activity), the platform software 320 retrieves the encrypted record value form the database 325 and decrypts the encrypted record value using the platform encryption mechanism to obtain a decrypted record value of sensitive information. Executing or processing a request includes retrieving the encrypted record value (e.g., stored in the database 325) required to process the request from the database 325. The encrypted record value is decrypted prior to being provided to any instructions that partially or completely carry out or participate in carrying out the request. For example, the decrypted record value provided by decrypting the encrypted record value can be provided to the instructions via a memory stack accessible only by the instructions as described below with respect to the platform encrypter module 402 of FIG. 4. In the create user request example, the encrypted password stored in the database 325 is retrieved from the database 325 and decrypted using the platform encryption mechanism. The step 3 can be further understood with reference to the input handler module 404 and the platform encrypter module 402 of FIG. 4.

An orchestration workflow including one or more orchestration activities can be executed by the platform software 320 in order to perform the request. An orchestration workflow or an orchestration activity can be initiated in response to an automated, timed, or the like, process initiated within, or by, the platform software 320. An orchestration workflow or an orchestration activity can be initiated by user input. Orchestration workflows can be triggered in other ways.

Some orchestration workflows use and transmit sensitive information (e.g., information within encrypted record values in database 325) from the provider environment 302 to the customer environment 304. It is to be noted, however, that the disclosure herein is not limited by or to orchestration activities or orchestration workflows.

An orchestration activity can automate single- or multi-system commands such as commands to be carried out, partially or completely, within the customer environment 304. The commands can be carried out by the agent software 335 or a customer system 340 (or one or more other customer systems), including but not limited to an LDAP server, of the customer environment 304. The platform software 320 can communicate commands to be executed in the customer environment 304 to the agent software 335 as described below with respect to the staging table and/or staging database which can be implemented as an external communication channel (ECC).

At step 4 of FIG. 3, if the platform software 320 determines that the sensitive information is to be communicated to the customer environment 304, then platform software 320 re-encrypts the decrypted record value of sensitive information (that has been decrypted via step 3) using an agent encryption mechanism (e.g., a second encryption mechanism different from the platform encryption mechanism) before communicating the sensitive information to the customer environment 304. The step 4 can be further understood with reference to the external request handler module 406 and the agent encrypter module 408 of FIG. 4. In an implementation, the platform software 320 re-encrypts sensitive information when the sensitive information is to be transmitted to the agent software 335 via a staging table (e.g., an ECC) or database in the provider environment 302.

If the sensitive information is not to be transmitted to the agent software 335 via the staging table, then the platform software 320 may not re-encrypt the sensitive information before communicating the sensitive information to the customer environment 304. In such a case, the sensitive information may still be transmitted to the customer environment as encrypted data when, for example, transport encryption is configured between the provider environment 302 or a system operable therein (e.g., the platform software 320) and the customer environment 304 or a system operable therein (e.g., the agent software 335). In such a case, it may not be necessary to re-encrypt the decrypted record value using the agent encryption mechanism because the decrypted record value is not stored in the staging table 412 by the platform software 320.

Returning to the create user example, the platform software 320 re-encrypts the retrieved encrypted password that has been decrypted from the database 325 using the agent encryption mechanism. The platform software 320 stores the re-encrypted password in a staging table of the database 325. The re-encrypted password is stored as part of a create-user command to be transmitted the agent software 335.

In an implementation of the agent encryption mechanism, a private and public key pair are generated by the agent software 335. The private and public key pair can be generated by a separate mechanism, including but not limited to, a key generator executed within the customer environment 304, and transmitted to the agent software 335. The public key may be communicated to various devices and/or software within the provider environment 302 and the customer environment 304. The private key can be stored at the agent software 335 and not be communicated outside of the customer environment 304. For example, the private key may be inaccessible by the provider environment 302.

The private key can be stored on a secure device in the customer environment. The secure device can be a device that is not accessible to or by the provider environment. For example, the secure device can be a device that resides behind a firewall that blocks access to devices in the provider environment. For example, the secure device can be a special-purpose device designed to hold and prevent unauthorized access to encryption keys. The secure device may be designed such that it permits decryption of information associated with a private key only by authorized users within the customer environment. The secure device or the agent device may be designed or configured such that the secure device is not discoverable or accessible by the platform software by way of the agent device.

The public key can be communicated to the platform software 320 of the provider environment 302, for example, within a key message. For example, the public key can be transmitted to the platform software 320. The platform software 320 uses the public key to implement the agent encryption mechanism to encrypt sensitive information to be communicated from the provider environment 302 to the customer environment 304. The platform software 320 can store the key message (e.g., the public key) in a database included within, or otherwise associated with, the provider environment 302 (e.g., the database 118 of FIG. 1 associated with the application node 114 of FIG. 1 on which the platform software 320 operates or the database 325).

A benefit of the steps of the interaction diagram 300 is that sensitive information received by the platform software 320 is prevented from disclosure in clear text via a platform encryption mechanism. By encrypting sensitive information using the platform encryption mechanism at the step 2, disclosure in clear text of the sensitive information is prevented in the platform software 320 and the provider environment 302. By decrypting the sensitive information using the platform encryption mechanism at the step 3 and re-encrypting the sensitive information using the agent encryption mechanism in step 4, disclosure of the clear text sensitive information can be avoided while still permitting the agent device to decrypt the sensitive information when communication with the agent device is carried out using a staging table and is logged in the provider environment, such as in database 325. For example, the clear text sensitive information may be retained in clear text in random access memory only during the operations to decrypt and re-encrypt, after which the clear text is discarded.

Another benefit of the steps of the interaction diagram 300 is that when sensitive information is to be communicated to a receiving system (e.g., the agent software 335) outside of the provider environment 302 and/or the platform software 320 or to a history log, the sensitive information is re-encrypted such that only the receiving system (or a system that can use the same decryption key as the receiving system) can decrypt and use the sensitive and information.

At step 5 of FIG. 3, the re-encrypted record value of sensitive information is transmitted to the agent software 335. The re-encrypted record value can be transmitted to the agent software 335 as part of a command. The command can be executed by the agent software 335. The command can be, at least partially, forwarded by the agent software 335 to one or more other systems, including the customer system 340 of the customer environment 304, to be executed. The command is transmitted to the agent software via the staging table of the database 325. The staging table can be a staging database separate from the database 325 or part of the database 325.

The staging table can be used to implement a message queue. The platform software 320 stores the re-encrypted record values of sensitive information (for example, a re-encrypted password) within the message queue, which may be queried, updated, or otherwise accessed, by other systems integrating with the platform software 320. The re-encrypted password is stored in the message queue as part of, including but not limited to, an orchestration command. An input message can be added to the message queue to indicate that the platform software 320 stored a command, including the re-encrypted password, and an output message can be added to indicate that the platform software 320 transmitted the command, including the re-encrypted password, for further processing.

The input and output messages can be queued using an ECC queue, which can be used to organize (e.g., queue) the communications between devices on which the agent software 335 and the platform software 320 are implemented. The agent software 335 can be configured to communicate with the platform software 320 on a periodic or non-periodic (e.g., event triggered) basis to retrieve commands and information from the ECC queue to be processed by the agent software 335. For example, the agent software 335 can send a request to the platform software 320 every predetermined time period (e.g., every 60 seconds) requesting that the platform software 320 transmit any messages stored within the staging table of the database 325 awaiting receipt by the agent software 335 (e.g., the command including the re-encrypted password). As another example, the agent software 335 can send a request to the platform software 320 via a first port (e.g., port 80) of a router device that, once received by the platform software 320, can cause a second port (e.g., port 443) of router device to open such that the platform software 320 can cause a message awaiting receipt by the agent software 335 to be transmitted to the agent software 335.

In response to the command including re-encrypted record values of sensitive information (for example, the re-encrypted password) being communicated to the agent software 335, the agent software 335 decrypts the command using the private key that is inaccessible to the platform software 320 and the provider environment 302. The private key used by the agent software 335 to decrypt the agent message can be associated with the public key used during the encryption, that is, the agent encryption mechanism. In response to decrypting the re-encrypted information using the private key, the agent software 335 can have access to the un-encrypted version of the information (e.g., in clear text form). In response to the agent software 335 decrypting the information using the private key, the information can be communicated by the agent software 335 to another component operating in, or otherwise associated with, the customer environment 304.

At step 6 of FIG. 3, if the command is to be executed, at least partially, by the customer system 340, then the agent software 335 forwards the decrypted sensitive information to the customer system 340. Additional encryption can be used when communicating data within the customer environment 304 including, but not limited to, communications between the agent software 335 and the customer system 340. For example, a layer of encryption used within the customer environment 304 can include encrypting and communicating a request using transport encryption. For example, the customer system 340 can be an LDAP server and LDAP over SSL can be used for the secure communication of data between the agent software 335 and the LDAP server within the customer environment 304. For example, the SSL of the LDAP over SSL can use public key cryptography (e.g., RSA) to negotiate an ephemeral symmetric key between the agent software 335 and the LDAP server. For example, the agent software 335 can re-encrypt a request received from the platform software 320 with the ephemeral symmetric key before the request is communicated to the LDAP server. The SSL of the LDAP over SSL can be TLS.

Referring back to the create user request example, communicating the password by the agent software 335 to the customer system 340 that is an LDAP server can include the agent software 335 re-encrypting the password using a key (e.g., a unique ephemeral symmetric key using AES-128 or 3DES) negotiated with the LDAP server and communicating the re-encrypted password to the LDAP server using LDAP over SSL. The LDAP server can hash and store the password in an associated database, for example, by indicating the password as the password for future system access by the corresponding user name. Where the password may be re-encrypted by the agent software 335 before it is communicated to the LDAP server, the LDAP server can decrypt the password using the negotiated key before hashing and storing it.

Implementations for securely communicating requests and sensitive information can include steps other than those shown in FIG. 3.

For example, instructions executing in or by the platform software 320 can create a history log record of the operations of the interaction diagram 300. For example, and without limitation, an orchestration activity or a workflow can create or cause to be created a workflow history log of the state of execution of the activity or the workflow. The history log record can contain sensitive information. As such, the platform software 320 causes the re-encrypted sensitive information to be included in the history log record to prevent disclosure of sensitive information in history logs, such as a workflow history log.

For example, communicating the public key to the provider environment 302 in advance may be omitted. For example, the public key may be stored at the agent software 335, and, in response to the platform software 320 receiving a request to communicate sensitive information to the agent software 335, a device or software within the provider environment 302 can transmit instructions (or direct the customer environment 304 to transmit instructions) for receiving the public key. The instructions may include information usable for accessing the customer environment 304 using, for example, an HTTP tunnel, HTTP sockets, or virtual private network (VPN).

The create user request used herein is for illustration purposes only and is a non-limiting example. Implementations of the present disclosure can be used for securing information other than passwords and for communicating requests other than create user requests. For example, the interaction diagram 300 can be used to securely transmit sensitive information, such as a credit card number, social security number, bank account routing number, etc., from devices and software within the provider environment 302, such as the platform software 320, to a device implementing the agent software 335 in the customer environment 304.

The steps, or operations, of any technique, process, or algorithm described in connection with the embodiments disclosed herein may be embodied directly in hardware, firmware, software executed by hardware, circuitry, or a combination thereof.

Figure 4:
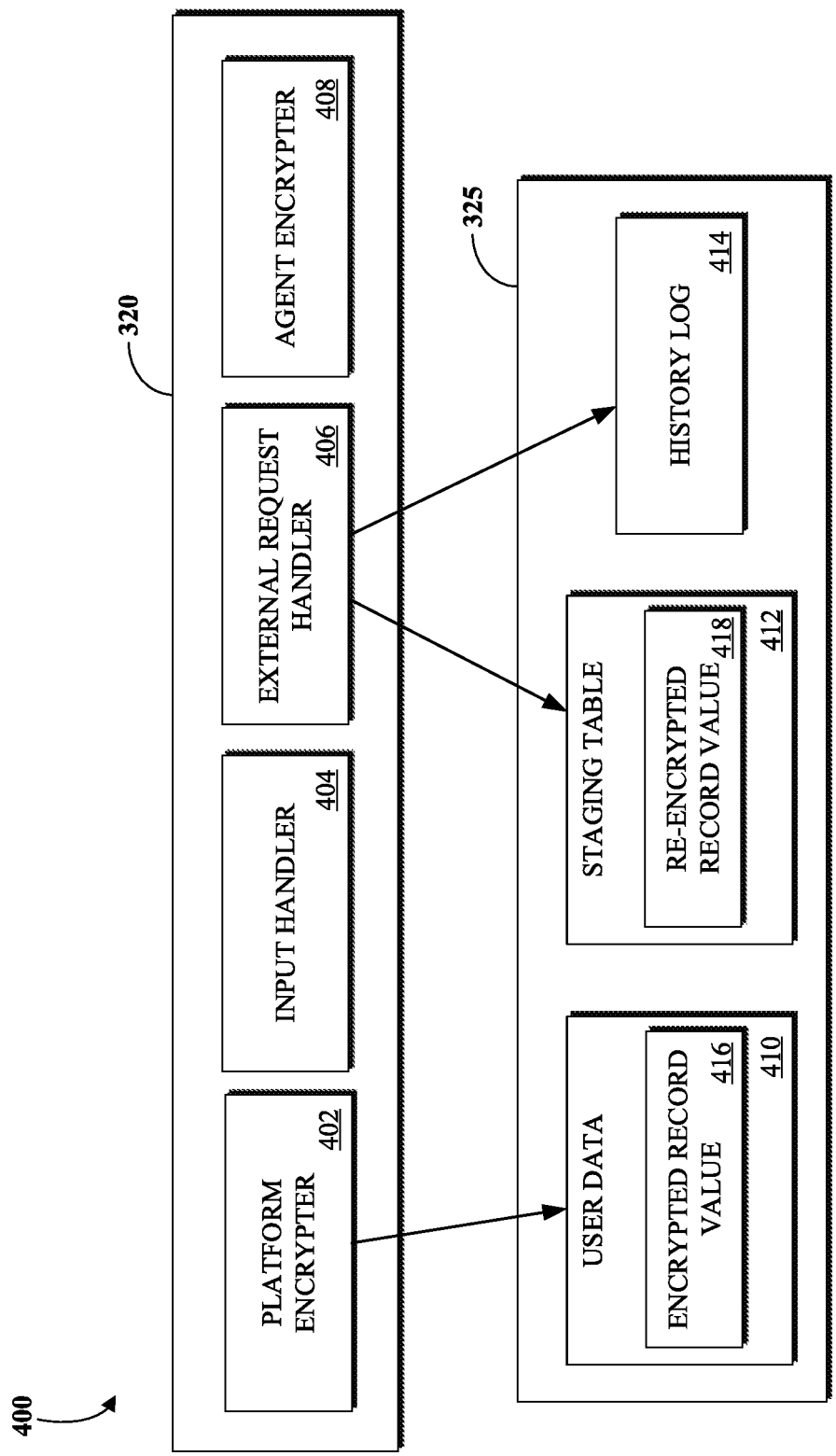
FIG. 4 is a block diagram of a system for securing sensitive information within a computing infrastructure in accordance with the present disclosure.

FIG. 4 is a block diagram of a system 400 for securing sensitive information within a computing infrastructure in accordance with the present disclosure. The system 400 can be implemented by a provider environment, such as the provider environment 302 of FIG. 3. Referring to FIGS. 3 and 4 together, in the system 400, the platform software 320 of FIG. 3 includes a platform encrypter module 402, an input handler module 404, an external request handler module 406, and an agent encrypter module 408. In the system 400, the database 325 of FIG. 3 includes a user data table 410, a staging table 412, and a history log table 414. In other implementations, the staging table 412 can be a staging database separate from the database 325. The history log table 414 can be a data store implemented outside of the database 325.

The platform encrypter module 402 encrypts information identified as sensitive prior to saving, or having saved, the information to the user data table 410. The encrypted sensitive information is stored in the user data table 410 as an encrypted record value 416. When information that is identified as sensitive (i.e., the encrypted record value 416) is retrieved from the user data table 410, the platform encrypter module 402 decrypts the information prior to further processing, such as by a component of the system 400, of the information. The platform encrypter module 402 uses a platform encryption mechanism. The platform encrypter module 402 receives input data, including but not limited to, from an end user or operator via a user interface or various systems or activities within or outside the system 400. Information can be identified as sensitive by tagging a variable associated with the information. Tagging a variable can mean declaring the variable as being of a certain type. Sensitive information can be declared, for example, as being of type password2 to indicate that the variable is to be two-way encrypted. Two-way encryption can indicate to the platform encrypter module 402 to store, or cause to be stored, the variable as a secure encrypted value (i.e., the encrypted record value 416) in the user data table 410 and that the value of the variable can be decrypted by the platform encrypter module 402 upon retrieval from the user data table 410. Alternatively, a variable can be declared as being of type password. The platform encrypter module 402 can be configured to one-way encrypt and store the variable of type password as a secure hash value such that the value cannot be decrypted to produce the original value of the information.

The input handler module 404 receives input data associated with a set of executing or executable instructions, such as a script, a program, or the like. For example, the input handler module 404 can retrieve data from database 325 for use by an activity, such as an orchestration activity, that is implemented using a script or program. An orchestration activity can be part of an orchestration workflow, which can include multiple activities. For example, an orchestration activity can include inputs and outputs. An input can be tagged as being encrypted and, for example, can be associated (i.e., mapped) to a value in a database, such as an encrypted record value in database 325. For example, when an activity is executed, the encrypted record value can be retrieved and decrypted from database 325 so that a decrypted record value is provided as an input value to the activity. An output can also be tagged as being encrypted. For example, when an activity is executed, a decrypted record value may be transmitted to an agent device. The decrypted record value may be re-encrypted before transmission or storage, such as described later. Alternatively, the decrypted record value may be encrypted using the platform encryption mechanism to produce an encrypted record value.

An activity or a workflow can first be configured and later executed in response to, for example, a user request or event. Configuring an activity can include, for example, identifying, including the inputs and outputs, the types of the inputs and the outputs, and identifying execution steps, such as an execution script, of the activity. An illustrative, non-limiting example, of configuring an activity is described below with respect to FIGS. 6A-6B. An activity may be reusable in more than one workflow.

Configuring a workflow can include configuring the workflow to use an activity. Configuring a workflow to use an activity can include mapping activity inputs and outputs to workflow inputs and outputs, to database records or fields within records, to literal values, any other mapping, or a combination thereof. When a workflow is executed, the input handler module 404 can use the activity mappings to pass input values to, and receive output values from, an activity. The input and output values may include decrypted record values. An illustrative, non-limiting example, of configuring a workflow to use an activity is described below with respect to FIG. 6C.

The input handler module 404 determines whether an input to an activity is configured as being encrypted. For example, an activity input is configured to be encrypted if it identified or tagged as Encrypted. The input handler module 404 can determine whether an encrypted activity input value is mapped to sensitive information, such as an encrypted record value. The input handler module 404 can determine whether an input of type Encrypted is mapped to a variable of type password (e.g., not decryptable) or password2 (e.g., decryptable). If an activity input of type Encrypted is not mapped to an encrypted record value, the input handler module 404 can issue an error. If an Encrypted activity variable is mapped to an encrypted record value, the input handler module 404 can request a decrypted record value of the encrypted record value from the platform encrypter module 402 and provide it to the activity. When the encrypted record value is one-way encrypted (e.g., password type), the activity may receive an encrypted record value instead of a decrypted record value. When the encrypted record value is two-way encrypted (e.g., password2 type), the activity receives the decrypted record value (e.g., in clear text form). The input handler module 404 can similarly determine whether an output of an activity is tagged as encrypted and mapped to sensitive information. For example, the input handler module 404 can determine whether an output of type Encrypted is mapped to a workflow variable of type password or password2. The input handler module 404 can request that, or can cause, the platform encrypter module 402 to encrypt the output value from the activity so that an encrypted record value is assigned to the workflow variable.

The external request handler module 406 determines whether an activity requires access to an external component that is outside the system 400. The activity can be a workflow orchestration activity or any other set of executing instructions, including but not limited to, an executable script executing within or by the system 400. The external request handler module 406 determines whether the activity is an orchestration activity that initiates a request to an external component that is, for example, an agent software, such as the agent software 335 of FIG. 3 executing in the customer environment 304. The external request handler module 406 can make the determination based on receiving a request from an activity for access, based on the type of activity (e.g., the activity is identified as an orchestration activity), by intercepting the request, or by other ways, or a combination thereof.

If the activity requires such access, and if the request includes sensitive information, such as for example, variables tagged as Encrypted, password, or password2, then the external request handler module 406 can cause the agent encrypter module 408 to encrypt the sensitive information using an encryption mechanism associated with the external component. For example, the agent encrypter module 408 can receive a decrypted record value that was decrypted from an encryption record value by the platform encrypter 402. The agent encrypter module 408 can then re-encrypt the decrypted record value so that a re-encrypted record value 418 is stored in the staging table 412 and/or the history log 414 (i.e., instead of the decrypted record value).

The agent encrypter module 408 can be configured to have access to a public key associated with the external component such that the agent encrypter module 408 uses the public key to encrypt information to be communicated to the external component. The public key can be a public key generated by an agent software, such as the agent software 335 of FIG. 3, and transmitted to the system 400 as described with respect to FIG. 3. Other configurations of encryption mechanisms and encryption keys can be available with the agent encrypter module 408. If an encryption mechanism is not associated with an external component, then the agent encrypter module 408 uses the platform encryption scheme or some other encryption mechanism associated with the system 400. When the external component is an agent software, such as the agent software 335 of FIG. 3, then the input handler module 404 uses an agent encryption mechanism associated with the agent software. The external request handler module 406 stores the request in the staging table 412 as described with respect to FIG. 3. To the extent that sensitive information is included in the request, the re-encrypted record values 418 of sensitive information, as encrypted by the agent encrypter module 408, are stored in the staging table 412 instead of the decrypted record values or encrypted record values 416. Alternatively, when sensitive information is included in the request, then the agent encrypter module 408 encrypts the whole message.

If the external request handler module 406 determines that a request to an external component is not a request to an agent software or is a request that is not be communicated via the staging table 412, then the external request handler module 406 does not cause the agent encrypter module 408 to encrypt the data. An external request that is not a request to an agent software as described above can be a web service call, including but not limited to, as REST or SOAP request. The external request handler module 406 can be configured to include a decrypted value (e.g., as decrypted by the platform encrypter module 402), in the request. Transport encryption can be configured thereby causing the request information to be transport-encrypted.

The external request handler module 406 stores a history record in the history log table 414. For example, the external request handler module 406 can store history records related to workflow execution, history records related to requests to external components, other types of history records, or a combination thereof. To the extent that sensitive information is included in a history entry, the re-encrypted value of sensitive information, as encrypted by the agent encrypter module 408, is stored in the history log table 414. If sensitive information is to be included in a history record, then it is re-encrypted by the agent encrypter module 408 prior to being stored in the history log table 414.

The platform encrypter module 402 communicates decrypted information to a memory stack. One, all, or a combination of, the input handler module 404, the external request handler module 406, and the agent encrypter module 408 access information stored in the memory stack. The memory stack can be a secure memory stack within the system 400. Decrypted information can only be stored temporarily within the system 400 on a secure local memory stack. The information stored within the memory stack can be removed after the agent encrypter module 408 encrypts the input data stored within the memory stack. The decrypted data can be removed from the memory stack upon completion of executable instructions which received the decrypted information. The executable instructions receiving the decrypted information include, without limitations, a workflow, an orchestration activity, a script, or the like. The memory stack may be associated with the execution of an activity or a workflow.

Some or all of the modules, components, and repositories associated with the system 400 can be implemented as a software application or can execute a software application to provide some or all of the features associated with a respective module or component. The system 400 can include more, less, or other modules. Some of the modules can be combined. For example, the platform encrypter module 402 and the input handler module 404 can be one module.

The system 400 can be implemented using computing devices, such as the computing device 200 of FIG. 2, or can be implemented as described with respect to the system 100 of FIG. 1. The system 400 can be implemented, for example, by a machine-readable program or other computer-executable instructions, such as instructions or programs described according to JavaScript, C, or other such instructions. The modules of the system 400 can, for example, be implemented using computer hardware, firmware, software executed by hardware, circuitry, or a combination thereof.

Figure 5:
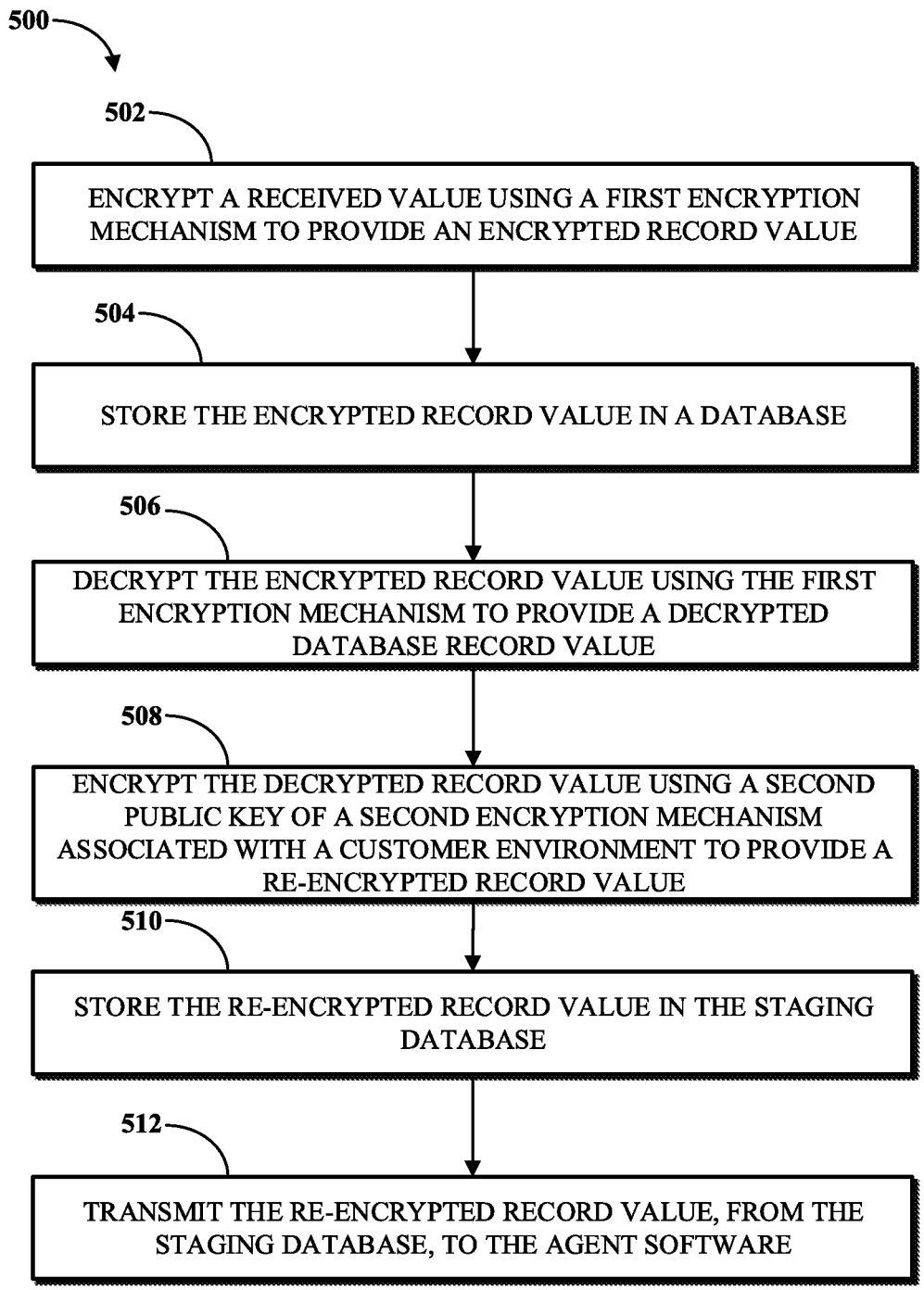
FIG. 5 is a flowchart illustrating a technique for transmitting encrypted record values stored in a database from a provider environment to a customer environment in accordance with the present disclosure.

FIG. 5 is a flowchart illustrating a technique 500 for transmitting encrypted record values stored in a database from a provider environment to a customer environment in accordance with the present disclosure. In an implementation, the provider environment and the customer environment are within a computer infrastructure, such as the system 100 of FIG. 1. The technique 500 can be used to communicate encrypted database content from the provider environment to the customer environment. The encrypted database content can be one or more values stored in one or more columns of a table of a database. The technique 500 can be executed using computing devices, such as the systems, modules, and devices described with respect to FIGS. 1-4. The technique 500 can be performed, for example, by executing a machine-readable program or other computer-executable instructions, such as instructions or programs described according to JavaScript, C, or other such instructions. The steps, or operations, of the technique 500 or any other technique, process, or algorithm described in connection with the implementations disclosed herein can be implemented directly in hardware, firmware, software executed by hardware, circuitry, or a combination thereof. The technique 500 can be implemented by an application software executing in a provider environment, such as the provider environment 302 of FIG. 3.

The technique 500 includes steps 502-512. At step 502, a received value is encrypted using a first encryption mechanism to provide an encrypted record value. The step 502 can be performed consistent with the description of the step 2 of FIG. 3. At step 504, the encrypted record value is stored in a database, such as a database of or associated with the provider environment. The step 504 can be performed consistent with the description of the step 2 of FIG. 3. At step 506, the encrypted record value is decrypted using the first encryption mechanism to provide a decrypted database record value. The step 506 can be performed consistent with the description the step 3 of FIG. 3. At step 508, the decrypted database record value is encrypted using a public key associated with a second encryption mechanism to provide a re-encrypted record value. The step 508 can be performed consistent with the description of the step 4 of FIG. 3. At step 510, the re-encrypted record value is stored in a staging table, such as a staging table of the database or a staging table associated with the provider environment. The step 510 can be performed consistent with the description of the step 4 of FIG. 3. At step 512, the re-encrypted record value is transmitted from the staging table to the agent software of the customer environment. The step 512 can be performed consistent with the description of the step 5 of FIG. 3. The steps 506-512 can be executed responsive to a request for the encrypted record value. For example, an orchestration activity can request the received value from a database, such as the database 410 of FIG. 4 where the received value can be stored as the encrypted record value 416. The steps 506-512 can also be executed responsive to predetermined instructions or scheduling by an operator. The steps 506-510 can also be executed responsive to a request received from an operator.

At step 502, a received value is encrypted using a first encryption mechanism associated with the provider environment to provide an encrypted record value. The received value is encrypted in response to determining that the received value is sensitive information. In this context, "receive" includes any way that the received for handing. Non-limiting examples of "receive" include a user filling an online form through a web browser, such as web browser executing in the client 104 of FIG. 1, and a programmatic request, such as a REST request which includes the received value. The first encryption mechanism can be a platform encryption mechanism. The first encryption mechanism can be an asymmetric encryption mechanism. The first encryption mechanism can be a symmetric encryption mechanism using a first public key and a first private key. The first public key can be used for encrypting the received value.

At step 504, the encrypted record value is stored in a database, such as the database 325 of FIG. 3. At step 506, the encrypted record value is decrypted using the first encryption mechanism to provide a decrypted record value. In the case of symmetric encryption, the encrypted record value can be decrypted using the private key associated with the first encryption mechanism. The encrypted record value can be decrypted in response to an instruction, script, an orchestration activity, or an orchestration workflow, or the like requiring access the record value.

At step 508, the decrypted record value is encrypted using a second public key of a second encryption mechanism to provide a re-encrypted record value. The second encryption mechanism can be an encryption mechanism associated with the customer environment. The second encryption mechanism can use the second public key to encrypt data at the provider environment and a second private key to decrypt encrypted data at the customer environment. The second encryption mechanism can be an agent encryption mechanism. The second public key can be received from the agent software. The second private key can be inaccessible by the provider environment (e.g., a server device of the provider environment). In other words, the second private key is held secret from the provider environment and thus not stored within the provider environment.

At step 510, the re-encrypted record value is stored in the staging database. The staging database stores and holds data to be transmitted to the agent software executing in the customer environment. The staging database can hold data temporarily or for a predetermined time period until the data is transmitted to the agent software. An encryption marker indicating that the re-encrypted record value is an encrypted value can be additionally stored in the staging database. The encryption marker can precede (or follow) a value in the staging database and can indicate that a succeeding (or preceding) value is to be treated as an encrypted value. As such, the recipient of the re-encrypted record value may decrypt the re-encrypted record value prior to processing.

At step 512, the re-encrypted record value is transmitted from the staging database of the provider environment to the agent software of the customer environment in response to a request to transmit the re-encrypted record value or information that includes the re-encrypted record value. The request can be received from the agent software or another system. The request can be received by the provider environment. The request can be a request from the agent software to pull the re-encrypted record value from the staging database (e.g., a pull request). Alternatively, the request can be a request to push the re-encrypted record value from the staging database to the agent software (e.g., a push request).

Although the technique 500 is shown as a series of operations for clarity, implementations of the technique 500 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted. For example, a history record indicating a transmission of the re-encrypted record value to the agent software can be generated. The history record can include the re-encrypted record value and does not include the decrypted record value or clear text form of the sensitive information. The history record can be generated before or after the step 506. The history record can be generated before or after the step 512.

FIGS. 6A-6C are an illustration of an example of graphical user interfaces 600, 620, 640 for configuring an activity usable for securing sensitive information within a computing infrastructure in accordance with the present disclosure. The graphical user interfaces 600, 620, and 640 can be of a software and the activity can be an orchestration activity. The graphical user interfaces 600, 620, 640 can be executed on a computing device, for example, a server device located in a datacenter (e.g., the datacenter 108 of the system 100) or the computing device 200 of FIG. 2. The software can be accessed by a client in communication with the customer environment (e.g., the client 104 of the system 100).

The graphical user interfaces 600, 620, 640 can comprise part of a software graphical user interface constituting data that reflect information ultimately destined for display on a hardware device, such as the client 104 of FIG. 1 or the computing device 200 of FIG. 2. For example, the data can contain rendering instructions for bounded graphical display regions, such as windows, or pixel information representative of controls, such as buttons and drop-down menus. The rendering instructions can, for example, be in the form of HTML, SGML, JavaScript, Jelly, AngularJS, or other text or binary instructions for generating a graphical user interface on a display that can be used to generate pixel information. A structured data output of one device can be provided to an input of the hardware display so that the elements provided on the hardware display screen represent the underlying structure of the output data.

FIGS. 6A-6B illustrate the graphical user interfaces 600, 620 for configuring a create user orchestration activity. FIG. 6A illustrates the graphical user interface 600 for configuring inputs of the create user orchestration activity. The create user orchestration activity requires two inputs, namely a username field 602 and a password field 604. The username field 602 is configured to be of String type. The password field 604 is configured to be of Encrypted type. By indicating that the password field 604 is of type Encrypted, a component such as the input handler module 404 of FIG. 4, can ensure that the password field 604 is connected to, or receives a value from, another field that is configured as sensitive information, such as one of type password or password2.

FIG. 6B illustrates the graphical user interface 620 for configuring an execution command of the create user orchestration activity. The execution command configuration 622 illustrates that the create user orchestration activity is configured to execute a CREATE USER SQL statement. The SQL statement is configured to include the two parameters ${activityinput.username} and ${activityinput.password}. During execution of the create user orchestration activity, actual values are substituted for the parameters based on inputs of the activity.

FIG. 6C illustrates the graphical user interface 640 for configuring an orchestration workflow to create a user. The orchestration workflow is configured to receive as input a password value from a column 648. The column 648 can be column in a database table (e.g., the column named u_user_pass). The column has a password type 646 that is "Password (2 Way Encryption)". That is, as described above, u_user_pass is identified as sensitive information and, as such, it is stored in a database as an encrypted value or encrypted record value (i.e., as encrypted by a platform encryption mechanism), such as the encrypted record value 416 of FIG. 4.

Another graphical user interface 645 of FIG. 6C illustrates configuring the activity of FIGS. 6A-6B when the activity is added to a workflow. In this illustration, the create user activity is configured to create a user with a hardcoded interface element username 644 (e.g., "testuser") and a password as given by an interface element password 642. The value of the password variable indicated by the interface element password 642 is to be assigned from the value of the workflow input value named ${workflow.inputs.u_user_pass}.

Referring to FIGS. 4 and 6 together, an exemplary partial flow through some of the modules of the modules of the system 400 of FIG. 4 is now given. The flow is for illustration purposes only and is non-limiting. Other flows are also possible consistent with this disclosure. In response to initiating execution of the create user activity, the input handler module 404 can determine whether an encrypted activity input receives its value from (i.e., is mapped to) a password or password2 field. In the instant example, the password field 604 is of type Encrypted and receives its value from the workflow variable specified by the column 648 with the password type 646, which is of the type password2. As such, the platform encrypter module 402 receives the encrypted password from the database, decrypts it using a platform encryption mechanism, and provides it to the input handler module 404. The input handler module 404 in turn provides the decrypted password value to the activity. If the value passed to an Encrypted variable is not of type password or of type password2, an error is generated. The error can be generated by the external request handler module 406 or by the input handler module 404, which terminates execution of the activity. The error can indicate that an input variable of type Encrypted did not receive a value of type password or type password2.

As the create user orchestration activity is an orchestration activity to be executed by an agent software in a customer environment, the external request handler module 406 can cause the agent encrypter module 408 to re-encrypt the decrypted password value using the agent encryption mechanism. Alternatively, the agent encrypter module 408 encrypts all of the command to be communicated to the agent software.

The external request handler module 406 can then store the command, including the re-encrypted value to the staging table 412 as the re-encrypted record value 418. As described below with the respect to FIG. 7, the external request handler module 406 can store an indication that a record in the staging table 412 includes a re-encrypted value. The external request handler module 406 can also store one or more history records in the history log table 414 based on the command stored in the staging table 412, based on the execution of the activity, based on the execution of the workflow, or any combination thereof.

If a command includes an indication that it includes re-encrypted information, then the agent software decrypts the command, if the whole command is encrypted, or decrypts only the encrypted parts of the command, using a key corresponding to the agent encryption mechanism used by the agent encrypter module 408 of FIG. 4.

Figure 7:
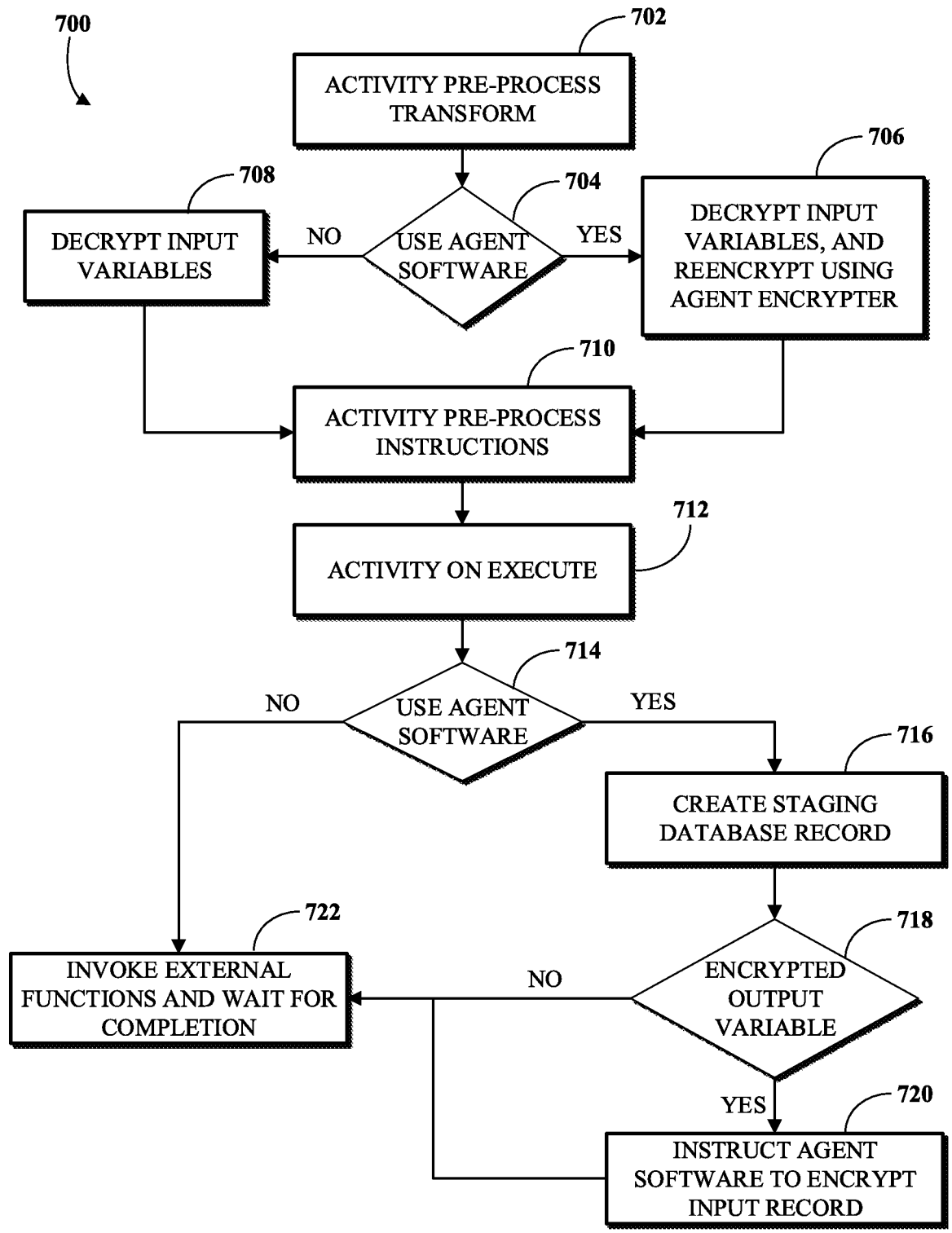
FIG. 7 is a flowchart illustrating a technique for initiating an orchestration activity for securing sensitive information within a computing infrastructure in accordance with the present disclosure.

FIG. 7 is a flowchart illustrating a technique 700 for initiating an orchestration activity for securing sensitive information within a computing infrastructure in accordance with the present disclosure. At step 702, as a pre-processing step and prior to the orchestration activity executing its specific function, the inputs to the orchestration activity are transformed and mapped. At this step 702, input variables of the orchestration activity marked as Encrypted, such as the password field 604 of FIG. 6A, are mapped from their source variables or inputs. The mapping can be to workflow variable (e.g., the workflow containing the orchestration activity).

In an implementation, such mapping can be indicated by ${workflow.inputs.xxx} to indicate that the orchestration activity input is to receive its value from an input (i.e., named xxx) to the workflow itself. The mapping can be to a variable internal to the workflow. Such mapping can be indicated by ${workflow.variables.xxx}, where xxx is the name of the internal workflow variable. An internal workflow variable is a variable created transiently by the instructions of the workflow during the execution of the workflow. The mapping can be to a column of a record accessible to the executing workflow or orchestration activity. Such mapping can be indicated by ${current.xxx}. The mapping can be to an output variable of a preceding activity in the workflow. Such mapping can be indicated by ${data.get(0).xxx}. The mapping can be to an empty string. Other mappings may be available. In the preceding, the variables named xxx are indicated as being sensitive information, such as, and as illustrated above, by being declared as of type Password2.

At step 704, the technique 700 determines whether the orchestration activity is of a type that uses the agent software, such as the agent software 335 of FIG. 3. An orchestration activity uses the agent software if the activity requires that either the agent software or another device or system in the customer environment, such as the customer environment 304 of FIG. 3, is required to perform some instructions in response to the orchestration activity. If at step 704 it is determined that agent software is to be used, then step 706 is performed, otherwise step 708 is performed. At step 708, an encrypted sensitive information is decrypted using a platform encryption mechanism but no re-encryption needs to take place. At step 706, an encrypted sensitive information is decrypted using a platform encryption mechanism, such as by the platform encrypter module 402 of FIG. 4, and then re-encrypted using an agent encryption mechanism such as by the agent encrypter module 408 of FIG. 4.

At step 710, pre-process instructions of the orchestration activity, if any, are executed. The pre-process instructions can be specified by a script, such as one written in JavaScript, or any other suitable programming language. At step 712, the orchestration activity waits until it receives an "execute" event. The execute event is received from a workflow engine executing the workflow. At step 714, the technique 700 determines whether the orchestration activity is of a type that uses the agent software. If at step 714 it is determined that agent software is to be used, then step 716 is performed, otherwise step 722 is performed. At step 716, a record is written to a staging database. The record can be a command and includes the re-encrypted value, such as the re-encrypted record value 418.

At step 718, it is determined whether one or more output variables of the activity are defined as encrypted. If so, then step 720 is performed, otherwise step 722 is performed. At step 720, the technique 700 indicates to the agent software to encrypt certain returned data such as illustrated below with respect to FIG. 10. At step 722, any external functions are executed and the orchestration activity waits for the completion of the external functions and/or the commands transmitted to the agent software.

Figure 8:
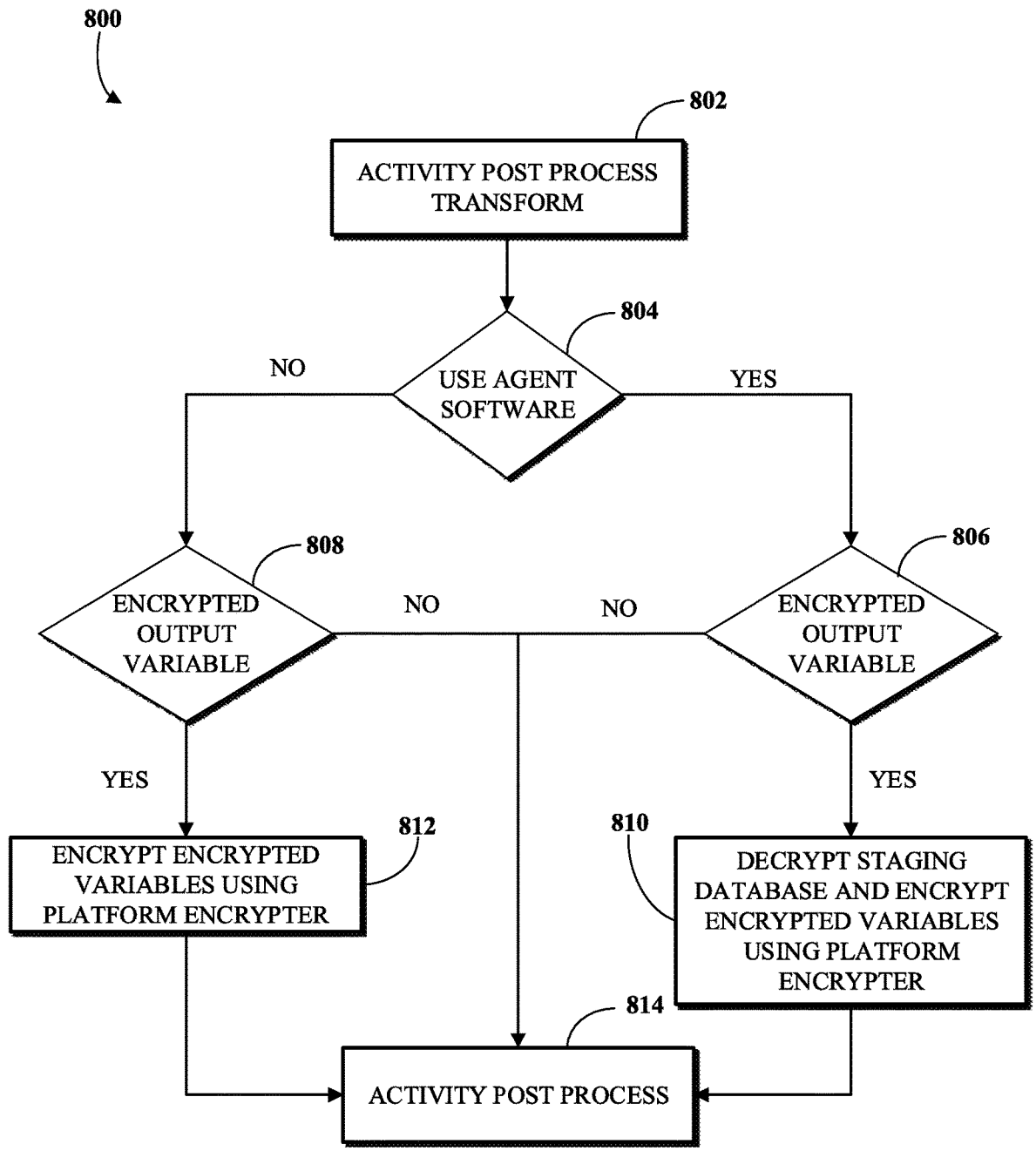
FIG. 8 is a flowchart illustrating a technique for receiving information by an orchestration activity for securing sensitive information within a computing infrastructure in accordance with the present disclosure.

FIG. 8 is a flowchart illustrating a technique 800 for receiving information by an orchestration activity for securing sensitive information within a computing infrastructure in accordance with the present disclosure. The technique 800 is executed, for example, upon the agent software completing a command transmitted through the staging database and the agent software indicating the completion by storing a record in the staging database.

At step 802, the technique 800 performs, for output variables, mapping steps similar to those performed by the technique 700 at step 702. At step 804, the technique 800 determines whether the orchestration activity is of a type that uses the agent software. If so, then step 806 is performed, otherwise step 808 is performed. At step 808, if the orchestration activity does not have encrypted output variables defined, then step 814 is performed, otherwise step 812 is performed. At step 812, the output variables defined as sensitive information (e.g., Encrypted), are encrypted by the platform encrypter.

At step 806, if the orchestration activity does not have encrypted output variables defined, then step 814 is performed, otherwise step 810 is performed. At step 810, the output variables defined as sensitive information (e.g., Encrypted), are read from the staging database. The sensitive information can be included in a message transmitted from the agent software through the staging database. The sensitive information is decrypted using an agent decrypter, such as the agent encrypter module 408 of FIG. 4. The sensitive information is then encrypted by the platform encrypter such as the platform encrypter module 402 of FIG. 4. At step 814, post processing activities are performed. Post processing activities can include but are not limited to storing encrypted data to a database.

Figure 9:
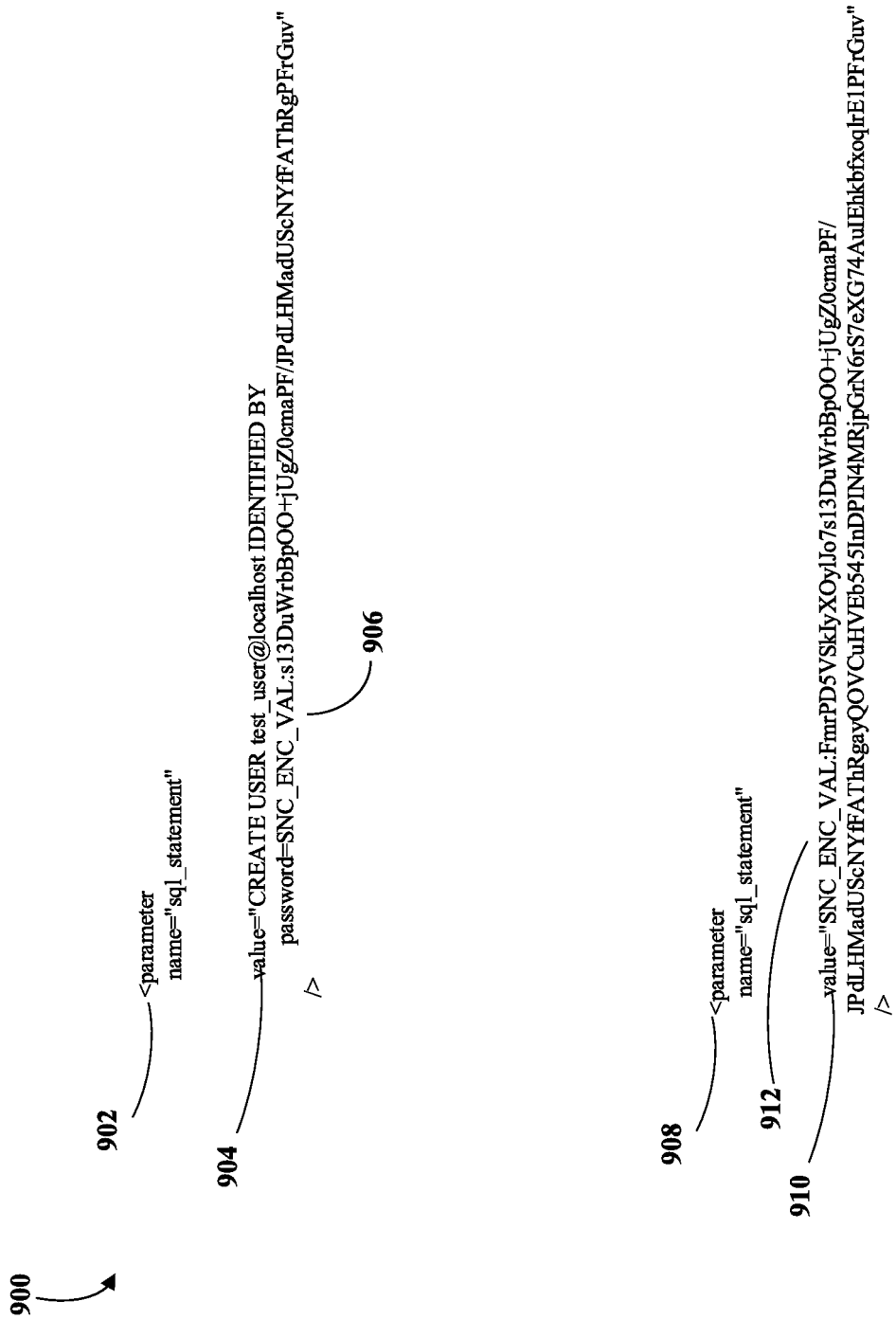
FIG. 9 is an illustration of commands in a staging database in accordance with the present disclosure.

FIG. 9 is an illustration of commands 900 in a staging database in accordance with the present disclosure. In an implementation, the staging database is the staging table 412 of FIG. 4. History records can be similarly configured. A command 902 (or first command of FIG. 9) illustrates an implementation where only re-encrypted record values are stored in the command to be transmitted to an agent software, such as the agent software 335 of FIG. 3. A command value 904 indicates that the password value is encrypted. In one embodiment, the encryption is indicated using a prefix or an encryption marker including, but not limited to, an encryption marker 906 with the value SNC_ENC_VAL. Prefixing a value with an encryption marker can indicate to the agent software that what follows the encryption marker is an encrypted value. A command 908 (or second command of FIG. 9) illustrates an implementation where a command value 910 is entirely encrypted. The encryption marker 906 prefixes only the password value (of the command value 904) whereas an encryption marker 912 prefixes the command value 910 as a whole or in its entirety. Decrypting the value that follows the encryption marker 912 results in the value "CREATE USER test_user@localhost IDENTIFIED BY password=<some password value>." Other or more indicators are also available.

FIG. 10 is an illustration of output 1000 returned by an agent software in accordance with the present disclosure. The output 1000 is the result of executing an orchestration activity with the command "select User, Password, password_expired, Host from mysql.user;" which returns all known users in the LDAP system of the customer environment 304 of FIG. 3. Referring to FIGS. 7, 8, and 10 together, as the output 1000 includes sensitive information (e.g., password information), a technique, for example the technique 700 via step 720, indicates to the agent software to encrypt data to be returned by the agent software prior to transmitting the data to the provider environment. Returned data 1002 indicates that the data returned by the agent software is encrypted. That is, the complete payload of the returned data 1002 is encrypted. When the returned data 1002 is processed, for example by the technique 800 via step 810, a record 1004 results. The record 1004 includes an encrypted password 1006 (i.e., the password information of the output 1000 that has been encrypted). The encrypted password 1006 is an encrypted received value and is encrypted by a platform encrypter module, such as the platform encrypter module 402 of FIG. 4 and via step 810.

Another implementation of this disclosure is a system for transmitting encrypted record values stored in a database from a provider environment to a customer environment. The system includes a means for encrypting a received value using a first encryption mechanism associated with the provider environment to provide an encrypted record value, a means for storing the encrypted record value in a database, a means for decrypting the encrypted record value using the first encryption mechanism to provide a decrypted record value, a means for encrypting the decrypted record value using a second public key of a second encryption mechanism associated with the customer environment to provide a re-encrypted record value, wherein the second private key of the second encryption mechanism is inaccessible by the server device, a means for storing the re-encrypted record value in a staging database, and a means for transmitting the re-encrypted record value from the staging database to an agent software in the customer environment.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array, (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC) or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

What is claimed is:

1. A system for transmitting an encrypted character string stored in a database from a provider environment to a customer environment, the system comprising:
    a server device operating in the provider environment, the server device including a memory and a processor, wherein the memory includes instructions executable by the processor to:
    receive a clear text character string in the provider environment;
    encrypt the received clear text character string in the provider environment using a provider public key associated with the provider environment to generate an encrypted character string;
    store the encrypted character string in the database of the provider environment;
    responsive to a request from the customer environment for the encrypted character string, retrieve the encrypted character string from the database of the provider environment;
    decrypt the encrypted character string in the provider environment using a provider private key to generate a decrypted character string;
    determine if the encrypted character string is to be transmitted to the customer environment using a transport encryption configured between the customer environment and the provider environment;
    in response to the determination that the encrypted character string is to be transmitted to the customer environment using the transport encryption, re-encrypt the decrypted character string using a transport encryption key and transmit the re-encrypted character string to the customer environment; and
    in response to the determination that the encrypted character string is not to be transmitted using the transport encryption:
    request a customer public key;
    receive the customer public key from the customer environment;
    encrypt the decrypted character string in the provider environment using the received customer public key associated with the customer environment to generate the re-encrypted character string and store the re-encrypted character string in a staging table of the database, wherein the staging table is external from the database, and wherein the provider environment sends a pull request to the staging table in response to the request to transmit the encrypted character string to the customer environment;
    store an encryption marker associated with the re-encrypted character string stored in the staging table, wherein the encryption marker indicates that the re-encrypted character string is an encrypted value; and
    transmit the re-encrypted character string from the staging table in the provider environment to the customer environment.

2. The system of claim 1, wherein the customer environment stores a customer private key, and wherein the customer private key is inaccessible by the server device in the provider environment.

3. The system of claim 1, wherein the received clear text character string is encrypted with the transport encryption key before being encrypted by the provider public key.

4. The system of claim 1, wherein the memory further includes instructions executable by the processor to:
    generate a history record that includes the re-encrypted character string and does not include the decrypted character string.

5. The system of claim 1, wherein the memory further includes instructions executable by the processor to:
    store, on the server device, the customer public key received from the customer environment.

6. A method for transmitting an encrypted character string stored in a database from a provider environment to a customer environment, the method comprising:
    receiving a clear text character string in the provider environment;
    encrypting the received clear text character string in the provider environment using a provider public key associated with the provider environment to generate an encrypted character string;
    storing the encrypted character string in the database of the provider environment;
    retrieving the encrypted character string in response to a request from the customer environment for the encrypted character string;
    decrypting the encrypted character string in the provider environment using a provider private key to generate a decrypted character string;
    determining if the encrypted character string is to be transmitted to the customer environment using a transport encryption configured between the customer environment and the provider environment;
    in response to the determination that the encrypted character string is to be transmitted to the customer environment using the transport encryption, re-encrypting the decrypted character string using a transport encryption key and transmitting the re-encrypted character string to the customer environment; and
    in response to the determination that the encrypted character string is not to be transmitted using the transport encryption:

requesting a customer public key;
receiving the customer public key from the customer environment;
encrypting the decrypted character string in the provider environment using the received customer public key associated with the customer environment to generate the re-encrypted character string and store the re-encrypted character string in a staging table of the database, wherein the staging table is external from the database, and wherein the provider environment sends a pull request to the staging table in response to the request to transmit the encrypted character string to the customer environment;
storing an encryption marker associated with the re-encrypted character string stored in the staging table, wherein the encryption marker indicates that the re-encrypted character string is an encrypted value; and
in response to the request received by the provider environment, transmitting the re-encrypted character string from the staging table in the provider environment to the customer environment.

7. The method of claim 6, wherein the request is transmitted by software in the customer environment.

8. The method of claim 7, further comprising:
generating a history record that includes the re-encrypted character string and does not include the decrypted character string.

9. The method of claim 6, wherein the received clear text character string is encrypted with the transport encryption key before being encrypted by the provider public key.

10. A non-transitory computer-readable storage medium for transmitting an encrypted character string stored in a database of a provider environment to a software in a customer environment, wherein the non-transitory computer-readable storage medium includes executable instructions that, when executed by a processor, facilitate performance of operations, comprising:
receiving a request from the customer environment to transmit the encrypted character string that is encrypted in the provider environment using a provider public key;
receiving a customer public key to the provider environment from the customer environment;
decrypting the encrypted character string in the provider environment using a provider private key to generate a decrypted character string;
determining if the encrypted character string is to be transmitted to the customer environment using a transport encryption configured between the customer environment and the provider environment;
in response to the determination that the encrypted character string is to be transmitted to the customer environment using the transport encryption, re-encrypting the decrypted character string using a transport encryption key and transmitting the re-encrypted character string to the customer environment; and
in response to the determination that the encrypted character string is not to be transmitted using the transport encryption, requesting a customer public key:
receiving the customer public key from the customer environment;
encrypting the decrypted character string in the provider environment using the received customer public key to generate the re-encrypted character string and store the re-encrypted character string in a staging table of the database, wherein the staging table is external from the database, and wherein the provider environment sends a pull request to the staging table in response to the request to transmit the encrypted character string to the customer environment;
storing an encryption marker associated with the re-encrypted character string stored in the staging table, wherein the encryption marker indicates that the re-encrypted character string is an encrypted value; and
transmitting the re-encrypted character string from the staging table in the provider environment to the software in the customer environment.

11. The non-transitory computer-readable storage medium of claim 10, wherein the customer environment stores a customer private key, wherein the customer private key is used for decryption and is accessible by the software.

12. The non-transitory computer-readable storage medium of claim 10, wherein the operations further comprise:
generating a history record that includes the re-encrypted character string and does not include the decrypted character string.

13. The non-transitory computer-readable storage medium of claim 10, wherein the operations further comprise:
in response to receiving clear text sensitive information in the provider environment, encrypting the received clear text sensitive information in the provider environment using the provider public key to provide the encrypted character string; and
storing the encrypted character string in the staging table of the provider environment.

14. The non-transitory computer-readable storage medium of claim 10, wherein the operations further comprise:
storing the re-encrypted character string in a database of the provider environment; and
receiving the request for the re-encrypted character string from the software for sensitive information in the database.

15. The non-transitory computer-readable storage medium of claim 10, wherein the staging table holds data temporarily for a predetermined time period prior to transmitting data to the software in the customer environment.

16. The non-transitory computer-readable storage medium of claim 10, wherein the staging table stores the encrypted character string along with a corresponding encryption marker indicating the values preceding, succeeding, or a combination thereof, are encrypted values.

17. The non-transitory computer-readable storage medium of claim 10, wherein the decrypted character string that is re-encrypted using the transport encryption key is not stored in the staging table in response to transmitting the re-encrypted character string using the transport encryption.

* * * * *